(12) United States Patent
Stoesser et al.

(10) Patent No.: US 7,470,823 B2
(45) Date of Patent: Dec. 30, 2008

(54) POLYETHERS AND THEIR USE AS CARRIER OILS

(75) Inventors: Michael Stoesser, Neuhofen (DE); Edward Bohres, Ludwigshafen (DE); Georg Heinrich Grosch, Bad Duerkheim (DE); Wilfried Sager, Mutterstadt (DE); Marc Walter, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 87 days.

(21) Appl. No.: 10/506,601

(22) PCT Filed: Mar. 10, 2003

(86) PCT No.: PCT/EP03/02411

§ 371 (c)(1),
(2), (4) Date: Sep. 10, 2004

(87) PCT Pub. No.: WO03/076492

PCT Pub. Date: Sep. 18, 2003

(65) Prior Publication Data

US 2005/0159628 A1    Jul. 21, 2005

(30) Foreign Application Priority Data

Mar. 11, 2002   (DE) ............................... 102 10 596

(51) Int. Cl.
*C07C 41/03*  (2006.01)
*C10L 1/185* (2006.01)

(52) U.S. Cl. .................. 568/618; 568/620; 208/14; 208/15; 208/16; 44/443

(58) Field of Classification Search ............... 568/618, 568/620; 208/14, 15, 16
See application file for complete search history.

(56) References Cited

U.S. PATENT DOCUMENTS

| | | | | |
|---|---|---|---|---|
| 2,841,479 A | * | 7/1958 | Hefner et al. | 44/443 |
| 4,877,416 A | * | 10/1989 | Campbell | 44/432 |
| 5,004,478 A | * | 4/1991 | Vogel et al. | 44/398 |
| 5,470,813 A | * | 11/1995 | Le-Khac | 502/175 |
| 6,699,961 B2 | * | 3/2004 | Eleveld et al. | 528/414 |
| 6,821,308 B2 | * | 11/2004 | Combs et al. | 44/443 |
| 6,919,486 B2 | * | 7/2005 | Dexheimer | 568/620 |
| 7,012,164 B2 | * | 3/2006 | Yamada et al. | 568/620 |
| 2004/0073069 A1 | * | 4/2004 | Heider et al. | 568/672 |

FOREIGN PATENT DOCUMENTS

| | | |
|---|---|---|
| EP | 0 374 461 | 6/1990 |
| WO | 98 44022 | 10/1998 |

* cited by examiner

*Primary Examiner*—Rosalynd Keys
(74) *Attorney, Agent, or Firm*—Oblon, Spivak, McClelland, Maier & Neustadt, P.C.

(57) ABSTRACT

The present invention relates to polyethers which are obtainable from 1-butene oxide and an alcohol using a double metal cyanide compound as a catalyst and have a content of unsaturated components of 6 mol% or more, to a process for preparing such a polyether and also to the use of a polyether according to the invention as a carrier oil or in a carrier oil formulation, in particular in additive packages for gasoline fuels, and furthermore also to carrier oil formulations and also to fuels comprising a polyether according to the invention.

11 Claims, No Drawings

POLYETHERS AND THEIR USE AS CARRIER OILS

The present invention relates to polyethers which are obtainable from 1-butene oxide and an alcohol using a double metal cyanide compound as a catalyst and have a content of unsaturated components of 6 mol % or more, to a process for preparing such a polyether and also to the use of a polyether according to the invention as a carrier oil or in a carrier oil formulation, in particular in additive packages for gasoline fuels, and also to carrier oil formulations and to fuels comprising a polyether according to the invention.

The prior art discloses various preparative processes for polyethers. Polyethers based on 1-butene oxide are reacted with long-chain fatty alcohols as the initiator to give monofunctional polyethers, conventionally by basic catalysis, for example using potassium hydroxide. These monofunctional polyethers may be used as carrier oils for petroleum additives. These polyethers prepared by means of basic catalysis have a certain level of unsaturated compounds, generally from 0.5 to less than 6 mol %.

As described, for example, in WO 98/44022, it had been hitherto assumed that the by-products resulting from the basically catalyzed polymerization, in particular polyols and unsaturated components, have a negative influence on the performance of the products obtained. WO 98/44022 discloses that polyethers prepared by means of double metal cyanide catalysis and having a content of less than 6 mol % of unsaturated compounds have distinctly improved properties as petroleum additives.

It is an object of the present invention to use this prior art as a starting point to provide further inexpensive, lipophilic polyethers based on 1-butene oxide which may be used, for example, as petroleum additives.

We have found that this object is achieved by polyethers which are obtainable from 1-butene oxide and an alcohol using a double metal cyanide compound as a catalyst and have a content of unsaturated components of 6 mol % or more.

Surprisingly, 1-butene oxide polyethers which have a relatively high content of unsaturated compounds and have been obtained by means of double metal cyanide catalysis in particular have very good properties as carrier oils. The utility of lipophilic 1-butene oxide polyethers which have an elevated content of unsaturated compounds as carrier oils for fuel additives was investigated. It was found that in contrast to the teaching of WO 98/44022, these lipophilic 1-butene oxide polyethers having an increased level of unsaturated components show no performance losses compared to classically prepared carrier oils based on 1-butene oxide having a lower proportion of unsaturated components.

According to the invention, polyethers having a content of unsaturated components of from 7 mol % to 50 mol %, for example from 8 mol % to 30 mol %, in particular from 9 mol % to 15 mol %, are particularly advantageous.

In preferred embodiments, the present invention therefore relates to polyethers having a content of unsaturated components of from 7 mol % to 50 mol %, to polyethers having a content of unsaturated components of from 8 mol % to 30 mol % or to polyethers having a content of unsaturated components of from 9 mol % to 15 mol %.

To prepare the polyethers according to the invention, alcohols, for example, having from 2 to 24 carbon atoms may be used, in particular alcohols having from 5 to 15, or, for example, having from 8 to 13, carbon atoms.

A further embodiment of the present invention therefore relates to polyethers which are prepared using an alcohol having from 2 to 24 carbon atoms.

For the purposes of the invention, the alcohol used for the preparation is advantageously a monofunctional alcohol. A further embodiment of the invention therefore relates to polyethers which are prepared using a monofunctional alcohol.

Examples of useful alcohols according to the invention include octanol, nonanol, decanol, undecanol, dodecanol, tridecanol, tetradecanol, pentadecanol, iso-octanol, iso-nonanol, iso-decanol, iso-undecanol, iso-dodecanol, iso-tridecanol, iso-tetradecanol, iso-pentadecanol, preferably iso-decanol, 2-propylheptanol, tridecanol, iso-tridecanol and mixtures of C13- to C15 alcohols.

The polyethers according to the invention have a viscosity at 40° C. of, for example, from 20 to 330 mm²/sec, in particular from 30 to 300 mm²/sec. According to the invention, the oxygen content of the polyethers may vary, but is at least 15.5%, in particular 16.5%.

A further embodiment of the invention therefore relates to polyethers which fulfill at least one of the following properties (A) or (B):

(A) the polyether has a viscosity at 40° C. of from 20 to 330 mm²/s;

(B) the polyether has an oxygen content of at least 15.5%.

The present invention furthermore relates to a process for preparing a polyether having a content of unsaturated components of 6 mol % or more by reacting 1-butene oxide and an alcohol with each other in the presence of a double metal cyanide compound as a catalyst.

The process according to the invention may be effected, for example, in a batch process, but according to the invention it is equally possible to perform the process semicontinuously or continuously.

In the process according to the invention, 1-butene oxide and an alcohol are reacted with each other. According to the invention, a monofunctional alcohol having from 2 to 24 carbon atoms is used for the process. A further embodiment of the present invention therefore relates to a process in which the alcohol used is a monofunctional alcohol having from 2 to 24 carbon atoms.

According to the invention, the alcohol and 1-butene oxide are reacted with each other in a molar ratio of from at least 1:3 to a maximum of 1:100, for example from 1:5 to 1:80, in particular from 1:1 to 1:50.

The catalyst used in the process according to the invention is a double metal cyanide compound.

DMC compounds suitable as catalysts are described, for example, in WO 99/16775 and DE 10117273.7. According to the invention, double metal cyanide compounds of the general formula I in particular are used as catalysts for the process according to the invention:

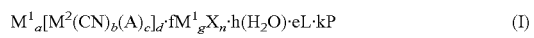

$$M^1_a[M^2(CN)_b(A)_c]_d \cdot fM^1_g X_n \cdot h(H_2O) \cdot eL \cdot kP \quad (I)$$

where $M^1$ is at least one metal ion selected from the group consisting of $Zn^{2+}$, $Fe^{2+}$, $Fe^{3+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, $Cu^{2+}$, $La^{3+}$, $Ce^{3+}$, $Ce^{4+}$, $Eu^{3+}$, $Ti^{3+}$, $Ti^{4+}$, $Ag^+$, $Rh^{2+}$, $Rh^{3+}$, $Ru^{2+}$ and $Ru^{3+}$, $M^2$ is at least one metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$ and $Ir^{3+}$, A and X are each independently an anion selected from the group consisting of halide, hydroxide, sulfate, carbonate, cyanide, thiocyanate, isocyanate, cyanate, carboxylate, oxalate, nitrate, nitrosyl, hydrogensulfate, phosphate, dihydrogenphosphate, hydrogenphosphate and hydrogencarbonate, L is a water-miscible ligand selected from the group consisting of alcohols, aldehydes, ketones, ethers, polyethers, esters, polyesters, polycarbonate, ureas, amides, primary, secondary and tertiary amines, ligands having pyridine nitrogen, nitriles, sulfides, phosphides, phosphites, phosphines, phosphonates and phosphates, k is a fraction or an integer greater than or equal to zero, and P is an organic additive, a, b, c, d, g and n are selected in such a manner as to ensure the electronic neutrality of the compound (I) and c may be 0, e, the number of ligand molecules, is a fraction or integer greater than or equal to 0, f, k, h and m are each independently a fraction or an integer greater than or equal to 0.

Organic additives P include: polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-co-maleic acid), polyacrylonitrile, polyalkyl acrylates, polyalkyl methacrylates, polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylenimines, maleic acid and maleic anhydride copolymers, hydroxyethylcellulose, polyacetates, ionic surface- and interface-active compounds, bile acid or salts, esters or amides thereof, carboxylic esters of polyhydric alcohols and glycosides.

These catalysts may be crystalline or amorphous. When k is zero, preference is given to crystalline double metal cyanide compounds. When k is greater than zero, preference is given to crystalline, semicrystalline and also substantially amorphous catalysts.

There are various preferred embodiments of the modified catalysts. One preferred embodiment is a catalyst of the formula (I) where k is greater than zero. The preferred catalyst then contains at least one double metal cyanide compound, at least one organic ligand and at least one organic additive P.

In another preferred embodiment, k is zero, e is optionally also zero and X is exclusively a carboxylate, preferably formate, acetate or propionate. Such catalysts are described in WO 99/16775. In this embodiment, preference is given to crystalline double metal cyanide catalysts. Preference is further given to double metal cyanide catalysts as described in WO 00/74845 which are crystalline and platelet-shaped.

The modified catalysts are prepared by combining a metal salt solution with a cyanometallate solution, each of which may optionally comprise both an organic ligand L and also an organic additive P. The organic ligand and optionally the organic additive are then added. In a preferred embodiment of the catalyst preparation, an inactive double metal cyanide phase is first prepared and then converted by recrystallization into an active double metal cyanide phase, as described in PCT/EP01/01893.

In another preferred embodiment of the catalysts, f, e and k are not equal to zero. These are double metal cyanide catalysts which comprise a water-miscible organic ligand (generally in amounts of from 0.5 to 30% by weight) and an organic additive (generally in amounts of from 5 to 80% by weight), as described in WO 98/06312. The catalysts may be prepared either with vigorous stirring (24 000 rpm with Turrax) or with stirring (U.S. Pat. No. 5,158,922).

Useful catalysts for the process according to the invention are in particular double metal cyanide compounds which comprise zinc, cobalt or iron or two thereof. A particularly suitable example is Prussian Blue.

According to the invention, preference is given to using crystalline DMC compounds. In a preferred embodiment, a crystalline DMC compound of the Zn—Co type which comprises zinc acetate as a further metal salt component is used as the catalyst. Such compounds crystallize in monoclinic structure and have a platelet-shaped habit. Such compounds are described, for example, in WO 00/74845 and PCT/EP01/01893.

DMC compounds suitable as catalysts for the process according to the invention may in principle be prepared in any of the ways known to those skilled in the art. The DMC compounds may be prepared, for example, by direct precipitation, the incipient wetness method, or by preparing a precursor phase and recrystallizing.

The DMC compounds may be used in the process according to the invention as a powder, paste or suspension or may be shaped into a shaped body, incorporated in shaped bodies, foams or the like, or applied to shaped bodies, foams or the like.

According to the invention, the double metal cyanide compound is used in an amount of from 5 ppm to 5000 ppm, for example from 100 ppm to 1000 ppm, in particular from 20 ppm to 500 ppm, based on the final amounts.

A further embodiment of the present invention therefore relates to a process in which the double metal cyanide compound is used in an amount of from 5 ppm to 5000 ppm, based on the final amounts.

According to the invention, it is possible, for example, to carry out the process in a batch method, in a semibatch method or continuously. For example, the initiator/DMC mixture may initially be dewatered by conventional vacuum means. The vacuum may then be broken using nitrogen and the epoxide metered in under elevated pressure of from about 1 bar to about 2 bar. According to the invention, it is also possible that the vacuum is not completely removed and the internal reactor pressure at the initiation of the epoxidation is less than 1 bar.

The present invention furthermore relates to the use of a polyether according to the invention as a carrier oil or in a carrier oil formulation, in particular in an additive package for gasoline fuels.

For the purposes of the present invention, a carrier oil formulation is a composition comprising at least one carrier oil according to the invention. For the purposes of the present invention, a carrier oil is a substance which is used, for example, in an additive package for gasoline fuels and has the purpose of suppressing the tendency of a further additive of the carrier oil formulation, for example a detergent, to cause a valve to stick and/or of improving the properties of an additive package with respect to keeping the inlet system and the inlet valve clean.

For the purposes of the present invention, an additive package for gasoline fuels is a composition which can be added to gasoline fuels in order to achieve an improved property profile of the gasoline fuel. According to the invention, an additive package for gasoline fuels comprises at least one carrier oil according to the invention or a carrier oil formulation according to the invention.

According to the invention, the carrier oil formulations, in particular the additive packages for gasoline fuels, comprise, in addition to a carrier oil, for example, the following additives: at least one detergent, at least one solvent, at least one corrosion inhibitor, at least one demulsifier, at least one lubricity improver, at least one conductivity improver, and at least one colorant or marker.

For the purposes of the present invention, examples of detergents, in particular for additive packages for gasoline fuels, include in principle the following compounds: polyisobutenamine (PIBA) prepared by hydroformylation of polyisobutene and subsequent hydrogenating amination; PIBA prepared by nitration of polyisobutene and subsequent hydrogenating amination; PIBA prepared by epoxidation of polyisobutene and subsequent hydrogenating amination; PIBA prepared by alkylation of phenol (cresol) using polyisobutene and subsequent Mannich synthesis with mono- and/or polyamines; PIBA prepared by chlorination of polyisobutene and subsequent reaction with mono- and/or polyamines; or polyisobutenesuccinimide prepared by maleating polyisobutene and subsequent imidation using mono- and/or polyamines.

In a preferred embodiment, the present invention therefore relates to the use of a polyether according to the invention or of a polyether preparable by the process according to the invention as a carrier oil and also to the use of a polyether according to the invention or a polyether preparable according to the invention in a carrier oil formulation, in particular in an additive package for gasoline fuels.

The carrier oils, carrier oil formulations and additive packages according to the invention for gasoline fuels have the advantage, for example, that they may be prepared particularly inexpensively using the DMC compounds used in preparing the polyethers according to the invention.

According to the invention, the carrier oil formulations, in particular the additive packages for gasoline fuels, have a content of at least one detergent of at least 10%. Preferred detergents for the additive packages according to the invention for gasoline fuels are polyisobutenamine or Mannich PIBA. A further embodiment of the present invention accordingly relates to the use of a polyether according to the invention or a polyether preparable by a process according to the invention in a carrier oil formulation, in particular in an additive package for gasoline fuels, each of which has a content of at least one detergent, preferably polyisobutenamine or Mannich PIBA, of at least 10%. In principle, the carrier oil formulations according to the invention, in particular the additive packages according to the invention, may also comprise mixtures of one or more of the detergents mentioned.

The present invention also relates to carrier oil formulations, in particular to additive packages for gasoline fuels themselves, which comprise a polyether according to the invention, and also to a fuel which comprises a polyether according to the invention or a carrier oil formulation according to the invention, in particular an additive package according to the invention for gasoline fuels. In a preferred embodiment, the present invention relates to a carrier oil formulation which is an additive package for gasoline fuels. A carrier oil formulation according to the invention or an additive package according to the invention for gasoline fuels may be added to a fuel, for example, in amounts of from 100 to 2000 mg/kg of fuel.

The invention is illustrated hereinbelow with the aid of examples.

EXAMPLES

Catalyst Synthesis:

In a stirred tank having a capacity of 30 l equipped with a pitched blade turbine, a submerged pipe for the metering-in, a pH electrode, a conductivity measuring cell and scattered light probe, 16 500 g of aqueous hexacyanocobaltic acid (cobalt content: 9 g/l cobalt) were initially charged and heated with stirring to 50° C. 9695.1 g of aqueous zinc acetate dihydrate solution (zinc content: 2.6% by weight) which had likewise been heated to 50° C. were then added within 45 minutes with stirring at a stirrer output of 0.5 W/l.

354 g of Pluronic PE 6200 (BASF AG) were then added. The batch was heated to 55° C. and stirring was continued at this temperature for 1.5 hours. 3370 g of aqueous zinc acetate dihydrate solution (zinc content: 2.6% by weight) were then metered in at 50° C. within 5 minutes. The stirring energy was increased to 1 W/l. The stirring of the suspension was continued at a temperature of 55° C. and a stirrer output of 1.0 W/l until the pH had fallen from 4.15 to 3.09 and remained constant. The resulting precipitate suspension was filtered off and washed with 10 l of water. The damp filter cake was dried at 50° C. under reduced pressure. A crystalline solid was obtained. The X-ray diffraction pattern of the solid obtained could be monoclinically indexed, and the particle habit was platelet-shaped.

1. Synthesis of Tridecanol N + 22 1-butene Oxide (KOH-catalyzed, Comparative Example):

In a 2 l stirred reactor, 150 g (0.75 mol) of tridecanol N and 2.7 g of KOH were initially charged. The reactor was purged three times with nitrogen and then a pressure test was carried out. The reactor was evacuated to from about 10 to 20 mbar. Under vacuum, the mixture was heated to 100° C. and dewatered at 100° C. for 2 hours. The vacuum was broken using nitrogen. The mixture was heated to from 135 to 140° C. and 50 g of 1-butene oxide were then metered in at this temperature. After the reaction commenced, 1-butene oxide was metered in up to a maximum pressure of 8 bar within about 13 hours, and the total amount of 1-butene oxide metered in was 1188 g. Stirring was then continued at 140° C. to constant pressure, and the mixture was cooled to 80° C., depressurized and degassed in a vacuum of from 10 to 20 mbar for 2 hours. The reactor was then emptied. The content of unsaturated components was less than 1 mol %.

2. Synthesis of Tridecanol N + 22 1-butene Oxide (DMC-catalyzed):

In a 2 l stirred reactor, 120 g (0.6 mol) of tridecanol N and 4.28 g of DMC catalyst were initially charged. The reactor was purged three times with nitrogen and then a pressure test was carried out. The reactor was evacuated (about 10 to 20 mbar). Under vacuum, the mixture was heated to 120° C. and dewatered at 120° C. for 1.5 hours. The vacuum was broken using nitrogen. The mixture was heated to 140° C. and 50 g of 1-butene oxide were initially metered in at this temperature at a starting pressure of 0.9 bar. Once the reaction had commenced, 1-butene oxide was added within 9.5 hours, and the total amount of 1-butene oxide was 952 g. Stirring was continued at 140° C. to constant pressure, then the mixture was cooled to 80° C. and degassed in a vacuum of from 10 to 20 mbar for 2 hours. The reactor was then emptied. The content of unsaturated components of the reaction product was 28.8 mol %, and the kinematic viscosity at 40° C. was 113.4 m$^2$/s.

Experiments 3 to 7 were carried out in a similar manner to experiment 2. The results of the experiments are compiled in Table 1.

TABLE 1

| Experiment | Initiator | Initiator [g] | Epoxide | Epoxide quantity [g] | Catalyst | Cat. quantity [ppm] | Temp. [° C.] | Unsaturated [mol %] | Viscosity [mm$^2$/s] |
|---|---|---|---|---|---|---|---|---|---|
| 1 | Tridecanol | 150 | 1-BO | 1188 | KOH | 2000 | 140 | <1 | 150.00 |
| 2 | Tridecanol | 120 | 1-BO | 952 | DMC | 200 | 140 | 28.8 | 113.37 |
| 3 | Tridecanol | 120 | 1-BO | 949 | DMC | 200 | 55 | 21 | 128.89 |
| 4 | Tridecanol | 120 | 1-BO | 952 | DMC | 25 | 135 | 28.1 | 112.81 |
| 5 | Tridecanol | 120 | 1-BO | 955 | DMC | 300 | 170 | 27.1 | 103.23 |
| 6 | Tridecanol | 100 | 1-BO | 792 | DMC | 200 | 135 | 14.1 | 144.00 |
| 7 | Tridecanol | 200 | PO | 845 | DMC | 25 | 135 | 4.2 | 56.47 |

Application Examples

A model additive package comprising a detergent (PIBA prepared via hydroformylation of polyisobutene and subsequent hydrogenating amination), a carrier oil (from experiment No. 1 or experiment No. 4) and a corrosion protector was tested by the following experiments:
 a) Emulsion test to DIN 51415
 b) Corrosion test to DIN 51585 (method A and B)
 c) Storage stability at −20° C., 0°C. and +35° C.
 d) Performance relating to intake valve cleanliness (IVD: intake valve deposits) and tendency to form chamber deposits (TCD: total chamber deposits) in MB M 111 according to CEC F-20-A-98 (CEC: Coordinating European Council).

The experiments were carried out according to the standards cited. The results of the experiments are presented in Tables 2 to 5.

TABLE 2

Emulsion test to DIN 51415 (dose: 600 mg/kg in a gasoline fuel according to DIN EN 228)

|  | Time [min] | Additive package based on carrier oil from experiment 1 | Additive package based on carrier oil from experiment 4 |
|---|---|---|---|
| pH 4 | 1 | 4 (4 ml of foam) | 4 (4 ml of foam) |
|  | 5 | 4 (1 ml of foam) | 3 |
|  | 30 | 2 | 3 |
|  | 60 | 1 | 1b |
| pH 7 | 1 | 3 | 3 |
|  | 5 | 2 | 2 |
|  | 30 | 1 | 1 |
|  | 60 | 1 | 1 |
| pH 9 | 1 | 3 | 2 |
|  | 5 | 1b | 1b |
|  | 30 | 1b | 1b |
|  | 60 | 1 | 1 |

TABLE 3

Corrosion test to DIN 51585 (method A and B) (dose: 600 mg/kg in fuel according to DIN EN 228)

|  | Double-distilled water | Synthetic salt water |
|---|---|---|
| Blank value | 0 | 3 |
| Additive package based on carrier oil from experiment 1 | 0 | 0 |

TABLE 3-continued

Corrosion test to DIN 51585 (method A and B) (dose: 600 mg/kg in fuel according to DIN EN 228)

|  | Double-distilled water | Synthetic salt water |
|---|---|---|
| Additive package based on carrier oil from experiment 4 | 0 | 0 |

TABLE 4

Storage stability at −20° C., 0° C. and +35° C.

| Time | Temperature [° C.] | Additive package based on carrier oil from experiment 1 | Additive package based on carrier oil from experiment 4 |
|---|---|---|---|
| Start | −20 | — | — |
|  | 0 | — | — |
|  | room temperature (RT) | clear, monophasic | clear, monophasic |
|  | 35 | — | — |
| 1 day | −20 | clear, monophasic | clear, monophasic |
|  | 0 | clear, monophasic | clear, monophasic |
|  | RT | — | — |
|  | 35 | clear, monophasic | clear, monophasic |
| 1 week | −20 | clear, monophasic | clear, monophasic |
|  | 0 | clear, monophasic | clear, monophasic |
|  | RT | — | — |
|  | 35 | clear, monophasic | clear, monophasic |
| 2 weeks | −20 | clear, monophasic | clear, monophasic |
|  | 0 | clear, monophasic | clear, monophasic |
|  | RT | — | — |
|  | 35 | clear, monophasic | clear, monophasic |
| 4 weeks | −20 | clear, monophasic | clear, monophasic |
|  | 0 | clear, monophasic | clear, monophasic |
|  | RT | — | — |
|  | 35 | clear, monophasic | clear, monophasic |

TABLE 5

Performance relating to intake valve cleanliness (IVD) and tendency to form chamber deposits (TCD) in MB M 111 according to CEC F-20-A-98 (dose: 275 mg/kg and 325 mg/kg of additive package in a gasoline fuel according to DIN EN 228)

| Active ingredient | Dose rate [mg/kg] | IVD [mg/V] | Average IVD [mg/V] | TCD [mg/cyl.] |
|---|---|---|---|---|
| Basis value | 0 | 329, 388, 273, 237, 244, 298, 474, 441 | 336 | 1479 |
| Basis value | 0 | 348, 389, 217, 209, 236, 232, 537, 557 | 341 | 1458 |
| Package based on carrier oil from experiment 1 | 275 | 0, 0, 51, 20, 23, 44, 0, 13 | 19 | 1530 |
| Package based on carrier oil from experiment 4 | 275 | 23, 0, 58, 42, 45, 101, 0, 17 | 36 | 1417 |
| Package based on carrier oil from experiment 1 | 325 | 4, 0, 21, 0, 1, 34, 1, 4 | 8 | 1544 |
| Package based on carrier oil from experiment 4 | 325 | 0, 0, 6, 0, 0, 40, 0, 11 | 7 | 1494 |

We claim:

1. A polyether obtained by reacting 1-butene oxide and tridecanol in the presence of a double metal cyanide compound as a catalyst, wherein the content of unsaturated components is 8 mol% to 30 mol%.

2. The polyether as claimed in claim 1, wherein
   (A) the polyether has a viscosity at 40° C. of from 20 to 330 mm$^2$/s; or
   (B) the polyether has an oxygen content of at least 15.5%.

3. A process for preparing the polyether as claimed in claim 1, the process comprising:
   reacting 1-butene oxide and tridecanol in the presence of a double metal cyanide compound as a catalyst.

4. A carrier oil formulation comprising at least one polyether as claimed in claim 1.

5. A carrier oil formulation as claimed in claim 4, which is an additive package for gasoline fuels.

6. A fuel comprising at least one polyether as claimed in claim 1.

7. A carrier oil formulation comprising a polyether obtained by the process as claimed in claim 3.

8. A carrier oil formulation as claimed in claim 7, which is an additive package for gasoline fuels.

9. A fuel comprising a polyether obtained by the process as claimed in claim 3.

10. A fuel comprising a carrier oil formulation as claimed in claim 4.

11. A fuel comprising a carrier oil formulation as claimed in claim 7.

* * * * *